United States Patent [19]
Watanabe

[11] Patent Number: 5,668,416
[45] Date of Patent: Sep. 16, 1997

[54] ANTI-THEFT VEHICLE SECURITY SYSTEM HAVING AN ENGINE CONTROL DEVICE AND AN ANTI-THEFT SECURITY DEVICE WHICH CONFIRM SUCCESSFUL COMMUNICATION

[75] Inventor: Motohiko Watanabe, Kobe, Japan

[73] Assignee: Mitsubishi Denki Kabushiki Kaisha, Tokyo, Japan

[21] Appl. No.: 645,867

[22] Filed: May 14, 1996

[30] Foreign Application Priority Data

Nov. 24, 1995 [JP] Japan .................. 7-306012

[51] Int. Cl.⁶ ............................................. B60R 25/04
[52] U.S. Cl. ............................................. 307/10.5; 180/287
[58] Field of Search ........................... 307/10.1–10.6; 180/287; 340/425.5, 426, 825.3–825.32, 825.34, 825.54, 825.69, 825.72; 70/DIG. 46; 364/424.01–424.05, 423.098, 424.034, 424.037, 424.038, 424.045; 370/85.3, 85.9, 85.11

[56] References Cited

U.S. PATENT DOCUMENTS

| | | | |
|---|---|---|---|
| 4,749,873 | 6/1988 | Mutoh et al. | 307/10.2 |
| 5,299,194 | 3/1994 | Ichii et al. | 370/85.3 |
| 5,528,086 | 6/1996 | Maass et al. | 307/10.5 |
| 5,539,260 | 7/1996 | Khangura et al. | 307/10.3 |
| 5,561,332 | 10/1996 | Udo et al. | 307/10.5 |

FOREIGN PATENT DOCUMENTS

6-227364  8/1994  Japan .

Primary Examiner—Richard T. Elms
Attorney, Agent, or Firm—Sughrue, Mion, Zinn, Macpeak & Seas

[57] ABSTRACT

Time required to start an engine is shortened by avoiding a collision in data exchange communication between an engine control device 3 and an anti-theft security device 6. Also, an attempt is made to achieve improved security and an improved reliability of communication. The system includes: an anti-theft security device 6 for determining whether starting of the engine should be allowed or not; an engine control device 3 for controlling start permission or start prohibition of the engine based on the determination of whether the starting should be allowed or not and for computing control of the engine based on various operating conditions; and communication control means 3-2, 6-2 defining a protocol where data exchange between said anti-theft security device 6 and the engine control device 3 including the result of determination of whether starting of the engine should be allowed or not is performed by sharing a single communication line 5 and data transmission is started from either the anti-theft security device 6 or the engine control device 3, the transmitting side continuing transmitting until the receiving side sends back a result indicating recognition of the transmitted content.

8 Claims, 5 Drawing Sheets

ANTI-THEFT VEHICLE SECURITY SYSTEM HAVING AN ENGINE CONTROL DEVICE AND AN ANTI-THEFT SECURITY DEVICE WHICH CONFIRM SUCCESSFUL COMMUNICATION

BACKGROUND OF THE INVENTION

1. Field of the Invention

The present invention relates to an anti-theft vehicle security system having a function for making it impossible to start an engine when an attempt is made for driving the motor vehicle in an unauthorized way for the purpose of stealing.

2. Description of the Related Art

In general, a possible case of stealing a vehicle includes a direct connection to an engine starting circuit (starter power supply) or use of a fake engine key, etc. Anti-theft security systems such as one disclosed in Japanese Patent Laid-Open Publication No. 6-227364 are known devices for preventing this type of theft. Noting the fact that an increasing number of new vehicles employ methods of controlling the fuel amount or ignition timing of the engine based on an engine control device, the anti-theft security system determines whether the engine key used in starting the engine is a proper key or not based on an ID code contained in the engine key. Based on the result of such determination, data as to whether starting of the engine should be allowed or not is transmitted to the engine control device by an electronic means, thereby the fuel supply and ignition timing of the engine are controlled to start the engine.

In the case as described above where the starting of the engine begins based on the result of an authentication as to whether the engine key is a proper one or not, each device performs an initialization for starting its operation in accordance with an ON operation of the engine key and enters its signal communication and signal processing state. Then, an ID code which has been electronically read out from the engine key by a code read means provided in the vicinity of the key switch is transmitted to an anti-theft security device on the vehicle. The anti-theft security device generates an engine start affirmation/negation signal based on the result of collating of the transmitted ID code and a previously set proper code.

On the other hand, upon entering its signal processing state, the engine control device performs exchange of data with the anti-theft security device through a communication line to invoke transmission of data as to whether starting of the engine should be allowed or not in response to the invocation by the engine control device, the anti-theft security device outputs the engine start affirmation/negation data to the engine control device through the described communication line described above.

Upon determining that starting of the engine is permitted based on the engine start affirmation/negation data, the engine control device outputs a start signal to the engine starting circuit, thereby starting of the engine becomes possible. However, if the engine control device has determined that starting of the engine should not be allowed, no start signal is output to the engine starting circuit. As a result, the vehicle will not be stolen even when the engine key is counterfeited.

As described above, the anti-theft security device and engine control device in the conventional system perform exchange of data for determining whether starting of the engine should be allowed or not by means of a shared single communication line. Depending on the operation environment (e.g., at the time of very low temperature or when a degraded battery is used) in starting the engine, it may thus take time to initiate a normal exchange of data, resulting in a problem that starting of the engine is delayed corresponding to such time period.

An adverse operation environment at the time of starting the engine leads to a temporary drop in the battery voltage, resulting in a state in which securing an operation voltage of the communication line is difficult. In such state, if each device performs respective data communication, normal transmission is hampered and data may not be accurately transmitted to a receiving end. In addition, since a protocol corresponding to degraded state of communication is not defined in the conventional system, time is required to eliminate the degraded communication state. Thus data exchange time for starting the engine is prolonged so that the starting of the engine is delayed corresponding to the prolonged time.

Further, while operations of both the anti-theft security device and the engine control device are reset when the battery voltage drops starting the engine, the reset voltage, reset release voltage and reset release timing for each device are different from each other. As a result, start timing of data exchange is different between the respective devices, causing a communication conflict on the communication line between the devices. Further, a protocol for eliminating a communication conflict, or for coping with a detected conflict, is not defined in the conventional system. If, therefore, communication is continued in the state where the two devices are in a communication conflict, data exchange time for starting the engine is prolonged until the communication conflict is eliminated in some way. Thus, the starting of the engine is delayed corresponding for such prolonged time period.

SUMMARY OF THE INVENTION

To solve the problems as described above, it is an object of the present invention to achieve an anti-theft vehicle security system in which, despite adverse communication conditions between the anti-theft security device and the engine control device delay in data communication between the two devices for starting the engine may be reduced and a prolongation of the engine starting time may be prevented.

According to an aspect of the present invention, there is provided an anti-theft vehicle security system comprising: a first control means for determining whether starting of an engine should be allowed or not based on an external signal; a second control means for performing a start permission or start prohibition control of the engine based on the determination result of the first control means; and communication means for managing exchange of control data between the first and second control means and for setting a protocol so that when one of the first and second control means is transmitting data and the other is receiving data, the data receiving side sends the result of recognizing the content of transmitted data from the data transmitting side back to the data transmitting side as reply data.

According to another aspect of the invention, there is provided an anti-theft vehicle security system comprising: anti-theft security means for determining whether starting of an engine should be allowed or not; engine control means for controlling start permission/prohibition of the engine based on whether starting of the engine should be allowed or not and at the same time for computing control of the engine based on various operating conditions; and communication means defining a protocol where data exchange between the anti-theft security means and engine control means including the result of determination on whether starting of the engine should be allowed or not from the anti-theft security means is performed by sharing a single communication line and data transmitting is started from one of the anti-theft security means or the engine control means, the transmitting side continuing transmitting until the receiving side sends back the result of recognizing the content of transmission.

In a preferred form, the communication means comprises a transmitting side which determines a normal transmission by verifying its own transmitted information which it transmitted through a communication line by means of an echo back method.

In another preferred form, the communication means includes communication conflict detection means for defining a protocol in which the transmitting side halts data transmission and performs receiving of information when recognizing transmission from the other end of the communication line.

In a further preferred form, the engine control means performs data exchange with the anti-theft security device a plurality of times of data exchange with the through the communication means to authenticate the result of determination of the anti-theft security device based on the data exchange.

In a further preferred form, the communication conflict detection means determines a communication conflict when the transmitting side detects a mismatch with data received by the data receiving side by checking the transmitted by the data transmitting side data.

DESCRIPTION OF THE PREFERRED EMBODIMENTS

Embodiment 1

Figure 1:
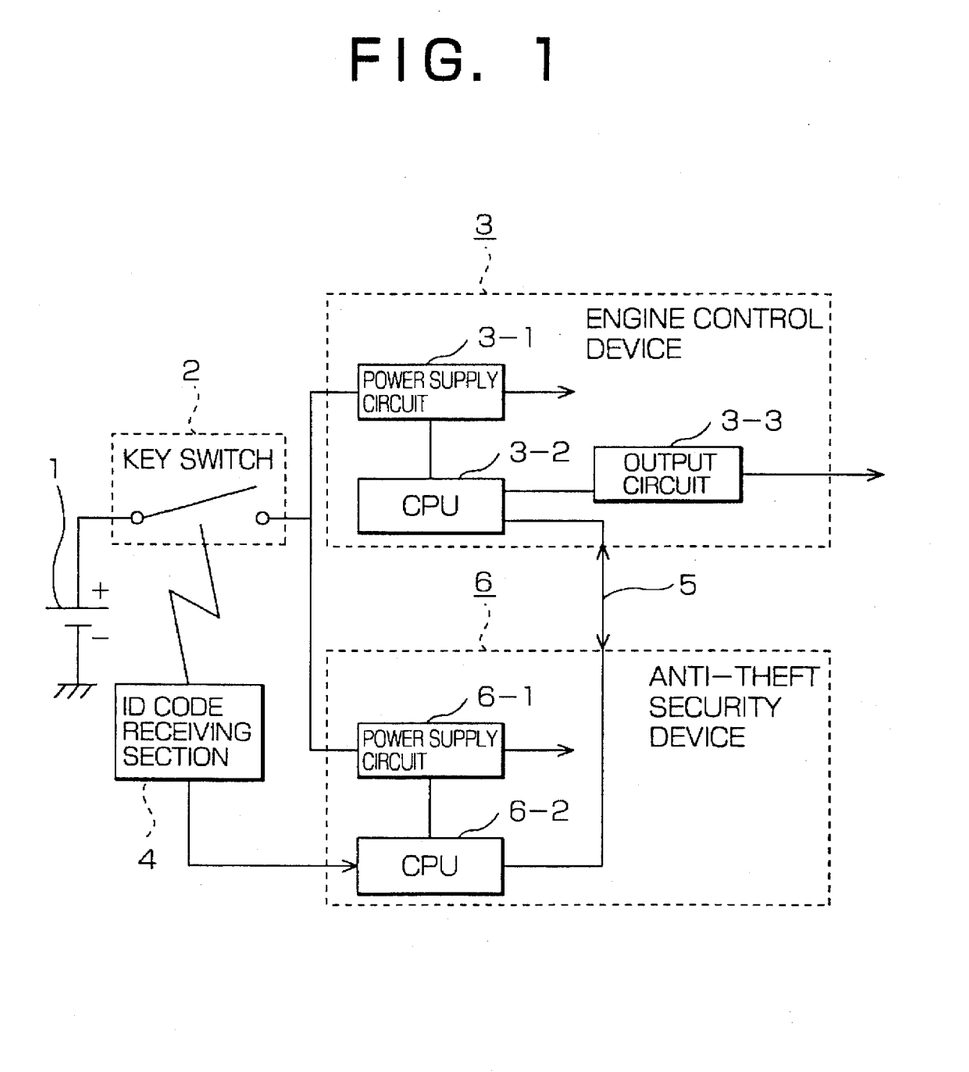
FIG. 1 is a block diagram showing the construction of an anti-theft vehicle security system according to a first embodiment of the invention.

An embodiment of the present invention will now be described with reference to the drawings. FIG. 1 is a block diagram showing the construction of a vehicle anti-theft security system according to the present embodiment. When a key switch 2 is turned ON by an engine key (not shown), voltage is supplied from a battery 1 to an engine control device 3 (first control means or engine control means) and an anti-theft security device 6 (second control means or anti-theft security means) to start operation. A code read section for converting and transmitting an ID code from the engine key into an electrical signal without a contact is incorporated into the key switch 2. The transmitted ID code is received at an ID code receiving section 4 and is output to the anti-theft security device 6.

The engine control device 3 includes: a power supply circuit 3-1 for bringing a battery voltage to a constant voltage and to supply the battery voltage to components of the engine control device 3; a CPU 3-2 for performing data exchange processing with the anti-theft security device 6 to start the engine and for generating an engine start/start-prohibition signal in accordance with data transmitted from the anti-theft security device 6; and an output circuit 3—3 for outputting the engine start/start-prohibition signal to respective actuators mounted on each part of the engine.

The anti-theft security device 6 includes: a power supply circuit 6-1 for bringing the battery voltage to a constant voltage and to supply the battery voltage to components of the anti-theft security device 6; and a CPU 6-2 for determining whether the ID code output from the ID code receiving section 4 is a proper and for outputting to the CPU 3-2 engine start affirmation/negation data generated based on several kinds of security codes for perfecting the anti-theft security function.

It should be noted that the communication means includes CPU 3-2, 6-2 and a communication line 5.

Operation of this embodiment will now be described.

When an operator turns-ON the key switch 2 by means of the engine key, a battery voltage of DC14V is supplied from the battery 1 respectively to the power supply circuit 3-1, 6-1 so that a constant voltage (normally at 5V) is generated. The constant voltage is then supplied to the CPUs 3-2, 6-2 as a power supply voltage.

In turning ON the key switch 2 having a security function by means of the engine key, the key switch 2 reads a unique ID code set for each engine key from a memory circuit which is incorporated in the engine key for transmitting the ID code to the ID code receiving section 4 by converting it into an electrical signal. The ID code is output to the CPU 6-2 of the anti-theft security device 6.

A security program for preventing theft and a data input/output program for starting the engine are contained in the CPU 6-2 for determining whether a received ID code is a proper or not. If the ID code is proper, data exchange is performed such that an engine start affirmation/negation data with its content allowing starting of the engine is output to the engine control device 3 through the communication line 5 in response to an engine start permission data transmitted from the engine control device 3 through the communication line 5.

A control sequence program for operating a signal to start or to prohibit a start of the engine based on an engine start affirmation/negation data is contained in the CPU 3-2. Accordingly, after receiving the engine start affirmation/negation data transmitted from the anti-theft security device 6, the CPU 3-2 computes a signal for permitting/prohibiting starting of the engine based on the control sequence program and outputs the signal from the output circuit 3—3 to actuators attached to the respective sections of the engine to bring the engine into a state where it may be started or state where it cannot be started.

Figure 2A:
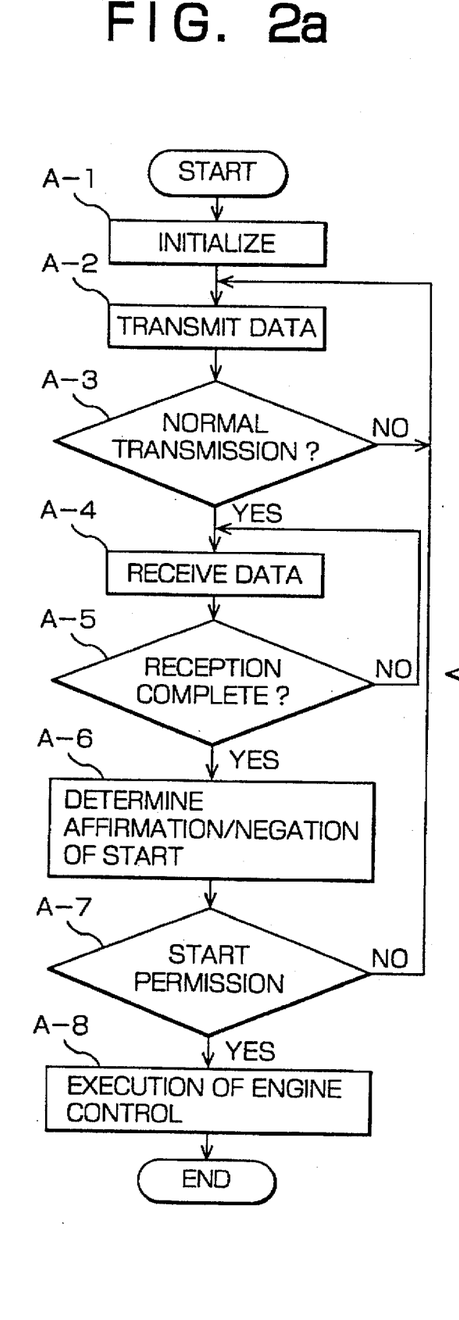
FIG. 2a is a flowchart for explaining operation of the engine control device in the above embodiment.

Operation of the CPU 3-2 of the engine control device 3 shown in FIG. 1 will now be described in accordance with the flowchart shown in FIG. 2a. When the key switch 2 is turned ON and a voltage is supplied to the CPU 3-2 from the power supply circuit 3-1, the control sequence program is started.

First, at this time, the CPU 3-2 performs an initialization processing where a previously determined initial value is set to a relevant RAM (step A-1). Next, engine start permission data for inquiring whether a condition for permitting starting of the engine has been achieved or not is transmitted to the anti-theft security device 6 through the communication line 5 (step A-2). After the data transmission, it is determined whether the data transmission has been made normally by checking the data which has been transmitted with a retransmitted version of itself using an echo check method made possible by a semi-duplex communication (step A-3). The data transmission is repeated until normal transmission occurs (step A-2).

That is, if, in starting the engine, the engine is cranked after a supply voltage has been applied to each CPU 3-2, 6-2, the load on the battery 1 is increased, for example, due to starting of a cell motor whereby the battery voltage is temporarily lowered at the time of a very low temperature or when using a deteriorated battery. Thus operation of each CPU 3-2, 6-2 becomes unstable so that a sufficient operation voltage on the communication line 5 may not be secured and a possibility occurs of transmission not being completed by a single cycle of data transmission.

Next, receiving is performed of an engine start affirmation/negation data from the anti-theft security device 3 in response to the transmitted engine start permission data (step A-4). It is then determined whether, the receiving has been complete or not (step A-5) and, if the receiving is complete, the program proceeds to the next processing. If not complete, the data receiving processing is repeated. However, if data is not received at step A-4, it is determined as a non-reception and receiving processing is terminated upon an elapse of a predetermined time period after the start of the receiving processing, and the program proceeds to data transmission processing of step A-2 again.

After the engine control device 3 has transmitted data at step A-2, if the next operation of the engine control device 3 is to be determined by a transmitting data from the anti-theft security device 6, the engine control device 3 is brought into its state for receiving engine start affirmation/negation data from the anti-theft security device 6 (state for waiting data necessary for starting the engine or stopping the engine).

After a determination of completion of the reception of the engine start affirmation/negation data at step A-5, a determination on whether starting of the engine should be allowed or not is performed by determining from the received data whether the engine has been started by a proper engine key or not (step A-6). If determined as engine start allowed (step A-7), a normal engine control sequence is executed (step A-8); if determined as start not allowed, transmitting of engine start permission data is performed again (step A-2).

If the engine start affirmation/negation data is transmitted from the anti-theft security device 6 when the data transmitting system is-unstable at the time of starting the engine, there is a possibility of the data being transmitted as engine start prohibiting data due to noise on the communication line 5 even though data allowing starting of the engine has been transmitted. Thus, if engine start prohibiting data has been received, the program returns to step A-2 and asks for a retransmission of the engine start affirmation/negation data.

Operation of CPU 6-2 of the anti-theft security device 6 shown in FIG. 1 will be described below in accordance with FIG. 2b. The key switch 1 is turned ON to start the program in the CPU 6-2 in a similar manner as the CPU 3-2 of the engine control device 3. First, the CPU 6-2 performs an initialization processing for setting a relevant RAM to a previously determined initial value (step B-1). Next, communication processing with the engine key is started to receive an ID code of the engine key (step B-2). However, if the ID code is not received, it is determined as non-reception and the receiving processing is terminated upon an elapse of a predetermined time period after the start of the processing.

Next, receiving of data from the engine control device 3 is performed (step B-3). Thereafter, it is determined whether engine start permission data has been received from the engine control device 3 based on the received data (step B-4). Upon receiving-the engine start permission data, a determination is made, for example, as to whether an operational voltage is secured on the communication line and whether reply and in response to the transmission of the engine start permission data from the engine control device 3 is possible (step B-5).

If the replying is possible, an engine start affirmation/negation data obtained as a result of communication with the engine key is transmitted to the engine control device 3 (step B-6). If the reply in response to the transmission of the engine start permission data is impossible, for example, possible communication conflict due to some data transmitted from the engine control device 3 through the communication line 5 or an noise which hampers normal communication on the communication line 5. In such a case, transmission of engine start affirmation/negation data is decided after waiting again for reception of engine start permission data from the engine control device 3 (step B-3). Thereby, communication conflict may be avoided.

If transmitting of the engine start affirmation/negation data becomes possible, transmitting of the engine start affirmation/negation data to the engine control device 3 is started-(step B-6). After the data transmission, a determination is made as to whether normal transmission has been executed by checking the transmitted data (step B-7). If normal transmission has not been executed, the data transmitting processing is repeated until normal transmission can be performed (step B-6).

If normal transmission seems possible, it is then determined whether the communication has been complete (step B-8). If the communication is complete, the processing is terminated. If the communication is not complete, data receiving processing from the engine control device 3 is repeated (step B-3), and next data is transmitted after waiting for a reception of the engine start permission data from the engine control device 3. As a result, a communication conflict between the engine control device 3 and the anti-theft security device 6 may be avoided.

Figure 3:
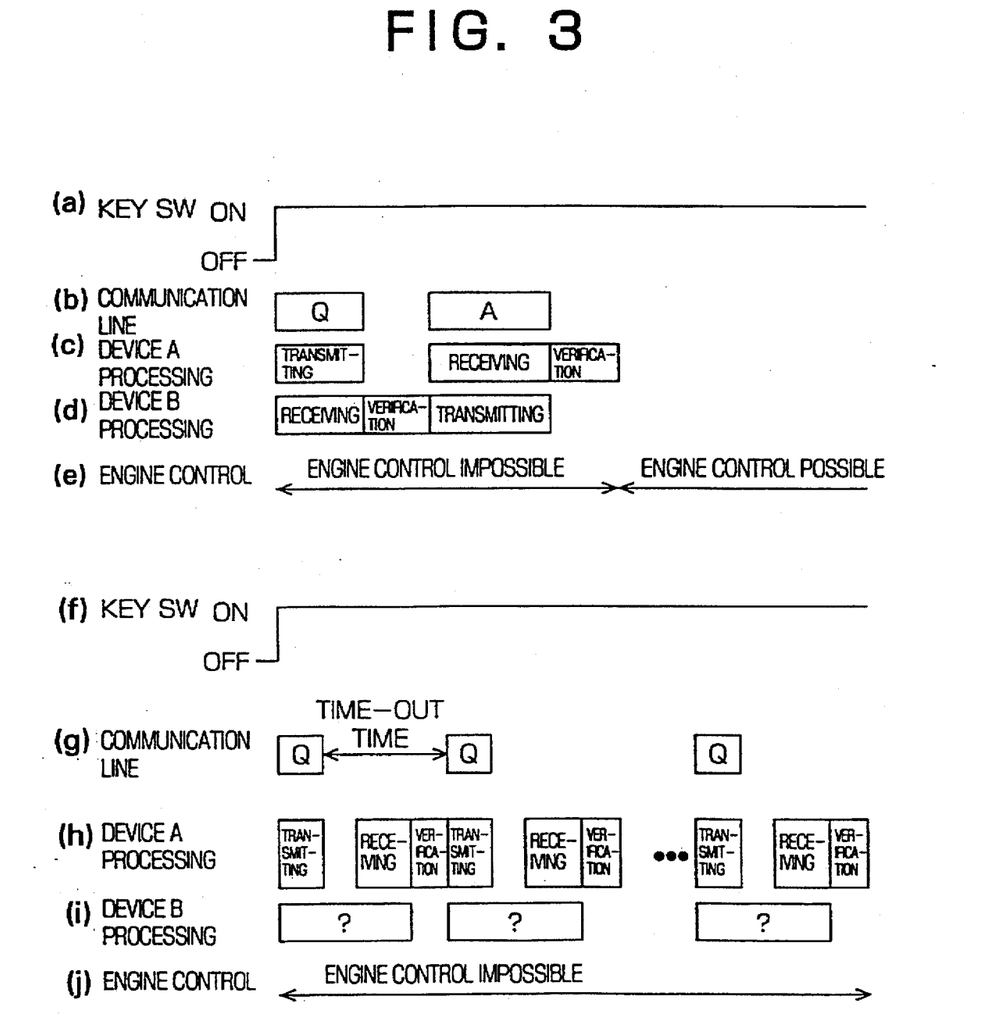
FIG. 3 is a diagram for explaining an information communication mode in the above embodiment.

Operation of the system will be described below by way of FIG. 3. In the figure: (a) indicates the ON-OFF state of the key switch 2; Q in the communication line (b) represents a transmitting data of the engine control device 3, while A represents a transmitting data of the anti-theft security device 6; (c) indicates the transmitting/receiving/reception-verification state of device A; (d) indicates the receiving/reception-verification/transmitting state of device B; and (e) indicates the engine control possible/impossible state based on the transmission and reception of data.

A description with respect to a Normal State of Operation is given below.

First, the key switch 1 is turned ON (a) and a battery voltage (14V) is supplied to the engine control device 3 to effect data communication between the anti-theft security device 6 and the engine control device 3. At this time, the engine control device 3 first transmits data Q (c). Next, the anti-theft security device 6 transmits data A after verifying a reception of data Q (d). At this time, the device on the transmitting side irrespective of whether it is device A or device B continues transmitting until the transmitting of data can be normally performed. On the other hand, the device on the receiving side is brought into a waiting state for such time period where it is continuously kept in receiving state. Finally, after completion of reception, the device A determines affirmation/negation of starting and outputs a control signal to the engine (e). However, data communication is repeated when a negation of starting is determined.

A description with respect to Operation Without Transmission from Device B is given below.

First, the engine control device 3 transmits data Q (b). Next, since there is no reply data A from the device B (d), the engine control device 3 determines a break after an elapse of a predetermined time period and repeats transmitting of data Q. If, during this course, data A from the anti-theft security device 6 is verified, it is determined as normal operation and processing at the time of normal operation is performed.

It should be noted that, while the communication is started from the engine control device 3 in the present embodiment, it is also possible to start communication from the anti-theft security device 6. The point is that the receiving side sends a reply after waiting for receiving of data from the transmitting side so that a communication conflict may be avoided even at the time of starting the engine when the state of communication is unstable.

Further, while the present embodiment aims at performing exchange of engine start permission data to obtain an engine start possible data, it is also possible for exchange of engine start permission data to be performed to convey an engine start impossible data to the engine control device 3.

Embodiment 2

In the above described Embodiment 1, a communication conflict is avoided by a protocol between the engine control device 1 and the anti-theft security device 3 so as to shorten the time required for starting the engine by shortening the data exchange time by the amount corresponding to a processing time period required for eliminating a communication conflict when one has occurred. However, if an actual communication conflict has occurred, processing time related to the communication conflict may be eliminated by halting transmission to shift to receiving processing so that a prolongation in data exchange time will not occur.

Figure 5:
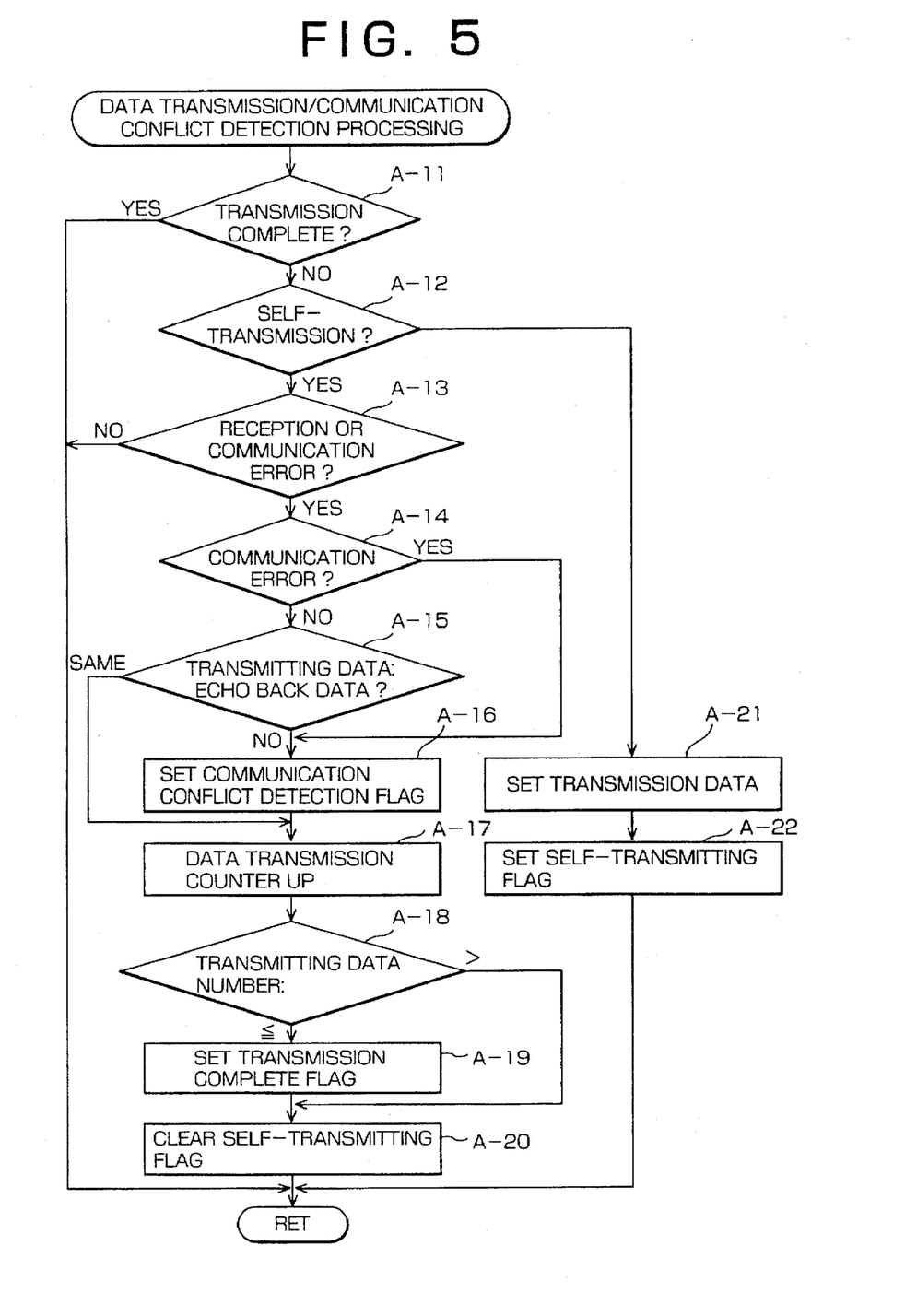
FIG. 5 is a flowchart for explaining the communication conflict detection processing in the second embodiment.

FIG. 5 is a flowchart for explaining communication control operation of the engine control device 3 in the present embodiment. Note that the same processing step numbers as in FIGS. 2a and 2b represent the same or corresponding processing. When the key switch 1 is turned ON and the control program in the CPU 3-2 is started, the CPU 3 first performs an initialization processing where a predetermined initial value is set to a relevant RAM (step A-1). Next, it transmits an engine start permission data to the anti-theft security device 6 and, during transmitting, performs the detection processing of a communication conflict, for example, through an echo check of its own transmitting signal (step A-9).

It is then determined whether a communication conflict has been detected or not (step A-10). Upon detection of a communication conflict, transmitting of the engine start permission data is immediately stopped to perform receiving processing of data from the anti-theft security device 6 (step A-4). If a communication conflict has not been detected, a determination is made after the transmission as to whether normal transmission has been effected by checking the transmitted data by means of the echo back method or the like (step A-3). Transmitting processing of data is repeated until a normal transmission is determined (step A-9).

In other words, in processing at steps A-9, A-10, A-3, if it is determined as that the next operation of the anti-theft security device 6 is decided based on a transmitted data from the engine control device 3, transmitting is continued until a normal transmission is complete. However, if a communication conflict has been detected, it is determined as that the anti-theft security device 6 is transmitting data and the transmitting processing is immediately halted. As a result, processing for eliminating a communication conflict is made unnecessary.

Next, receiving is performed of engine start affirmation/negation data from the anti-theft security device 3 in response to the transmitted engine start permission data (step A-4). It is then determined whether the receiving is complete (step A-5), and the program proceeds to the next processing if the receiving is complete. If not complete, the data receiving processing is repeated again. However, if no data is received at step A-4, it is determined as non-reception where the receiving processing is terminated upon an elapse of a predetermined time period after the start of the receiving processing, and the program proceeds again to the data transmitting processing at step A-2.

After the data transmission by the engine control device 3 at step A-2, if the next operation of the engine control device 3 is decided by a transmitting data from the anti-theft security device 6, the state of the engine control device 3 is brought into a waiting state awaiting an engine start affirmation/negation data from the anti-theft security device 6 (waiting state for data necessary for starting the engine or stopping the engine).

After a determination on completion of receiving of the engine start affirmation/negation data at step A-5, it is determined based on the received data whether the engine has been started by a proper engine key or not so as to make a determination on whether the starting should be allowed or not (step A-6). If an engine start permission is determined (step A-7), a normal engine control sequence is executed (step A-8), while, if the starting is not permitted, the data transmitting processing is performed again (step A-2).

The reason for this operation is that, if in starting the engine, engine start affirmation/negation data is transmitted when the data transmission is unstable, there is a possibility of data for permitting starting of the engine being transmitted as data of not permitting starting of the engine due to noise on the communication line 5. Thus, if data not permitting starting of the engine is received, the program returns to step A-2 and requests for transmission of the engine start affirmation/negation data.

Figure 2B:
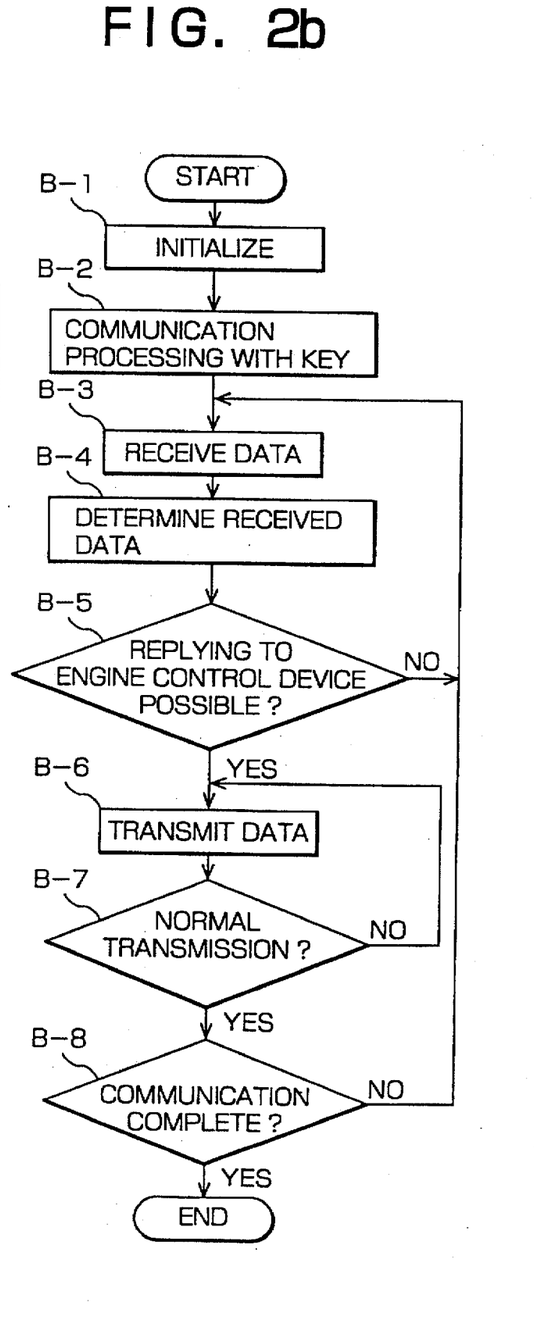
FIG. 2b is a flowchart for explaining the operation of the anti-theft security device in the above embodiment.

Data transmitting/receiving processing of the anti-theft security device 6 in response to the engine start permission data from the engine control device 3 is similar to the processing of the flowchart of FIG. 2b. Further, while in Embodiment 2, only the processing at the time of communication conflict is the engine control device 3 side has been described, it is also possible for the anti-theft security device 6 to stop transmitting immediately when a communication conflict has been detected. As a result, time to be spent for processing the communication conflict may be eliminated on the data transmitting side, so that there is no possibility of data exchange time being prolonged even if a communication conflict occurs, making it possible to prevent a prolongation of the engine starting time.

Figure 4:
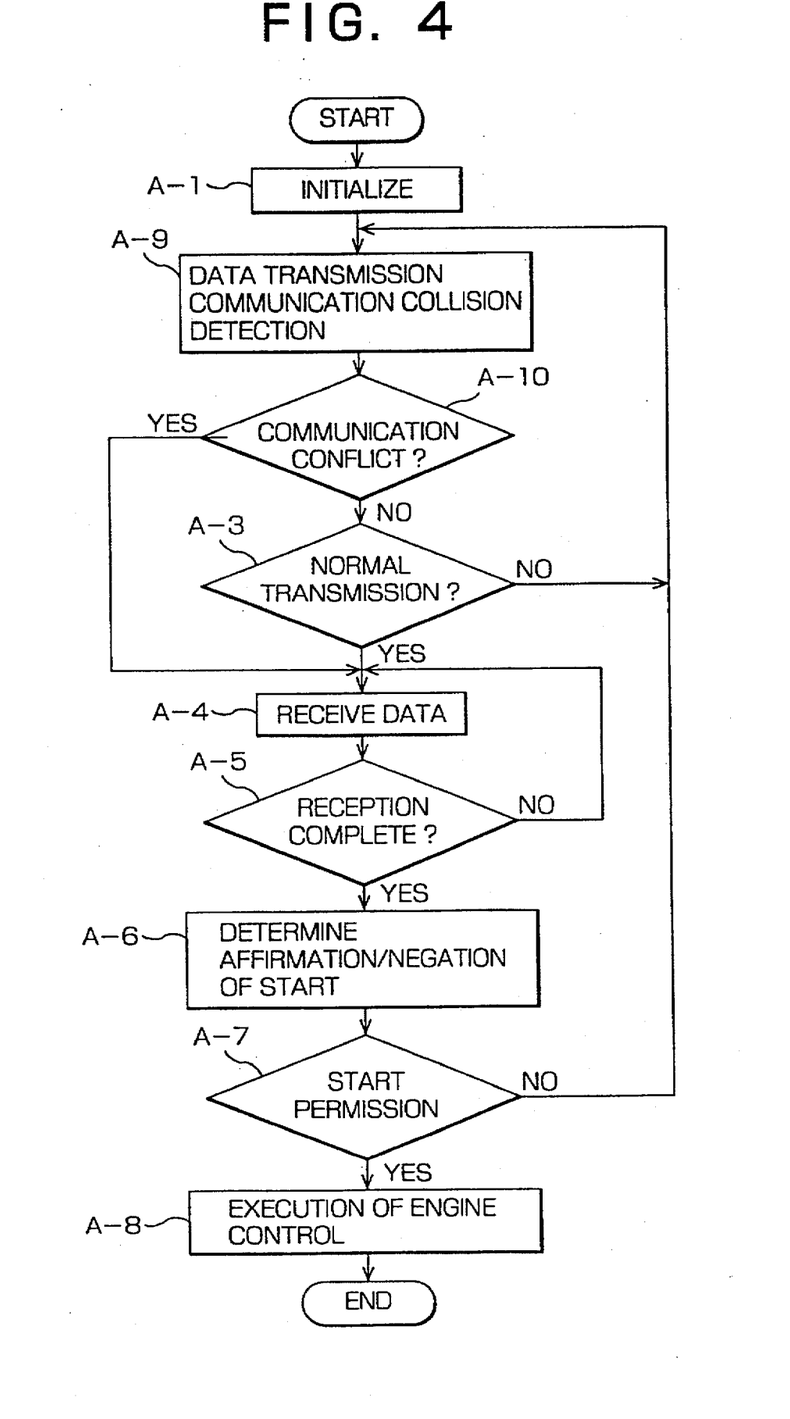
FIG. 4 is a block diagram showing the construction of an anti-theft vehicle security system according to a second embodiment of the invention.

FIG. 4 shows a flowchart of data transmitting and communication conflict detection processing, for example in the engine control device. This detection processing is performed a number of times corresponding to data transmission at each predetermined time for transmitting engine start permission data constituted by a plurality of data consisting of a plurality of bytes.

In the transmission processing of engine start permitting data, it is first determined whether transmission of one data has been complete from a counter for the number of bytes of data (step A-11). Only if the transmission is not complete, the following processing is performed. In all the other cases, the program pulls out of the data transmission and communication conflict detection processing.

Next, a self-transmitting judgment as to whether transmitting is being performed (step A-12). If not transmitting, setting of the transmission data is performed (step A-21), a flag for indicating performance of the transmitting process is SET (step A-22), and the program pulls out of the data transmitting processing. During the process of transmitting, the following processing is performed. Since a semi-duplex communication line is used between the engine control device 3 and the anti-theft security device 6, data transmitted by each device is echoed back to the device which transmitted that data transmission and received. It is thus determined whether echoed back data has been received by the original transmitting device or whether a communication error has resulted due to a noise occurring on the transmitting data as indicated by the original transmitting device not receiving echo back data (step A-13).

If determined as a reception of echo back data or a communication error (step A-14), a communication conflict detection flag is SET (step A-16). If not determined as a communication error, it is determined whether or not a match occurs between the transmitted data and echo back data (step A-15). If no match occurs, it is determined as detection of communication conflict and a communication conflict detection flag is SET (step A-16).

Next, after setting the communication conflict detection flag, the transmitting data counter is counted up by "1" (step A-17). If count value in the transmitting data counter indicates count value is less than or equal to a preset number of data transmission (step A-18), completion of transmitting is determined and a transmitting completion flag is SET (step A-19). Finally, the self-transmitting flag is cleared (step A-20) and the program pulls out of the data transmission processing. If count value of transmitted data is greater than the preset number of data transmission, the self-transmitting flag is cleared (step A-20). Here, when the receiving side device recognizes the content of communication and sends the result as a reply, a communication conflict is detected by a determination of a communication error or of the matching of the transmitted data and the echo back signal.

What is claimed is:

1. An anti-theft device for a vehicle comprising:

first control means for determining allowance to start an engine based on an external signal, for providing a determination result, and for transmitting and receiving test data for establishing a data circuit;

second control means for performing control to allow or prohibit start of said engine based on the determination result by said first control means, and for transmitting and receiving test data for establishing a data circuit;

transmission data detection means for determining whether transmission data is properly transmitted before determination of allowance to start the engine;

data return means for returning data which causes one of said first and second control means to recognize that data is received by another of said first and second control means as the result of data transmission;

data circuit establishment detection means for detecting whether or not the returned data is correct and for determining establishment of a data circuit between said first and second control means if said returned data is correct;

data transmission repeat means for repeating data transmission which requests again the returned data again if said returned data is not correct; and normal data communication means for starting communication of normal data between said first and second control means when said data circuit is detected to be established by said data circuit establishment detection means.

2. An antitheft device for a vehicle comprising:

anti-theft means for determining allowance to start an engine based on an external signal, and for transmitting and receiving test data for establishing a data circuit;

engine control means for transmitting and receiving test data for establishing a data circuit, performing control data to allow or prohibit start of said engine based on the determination result by said antitheft means, and controlling the engine by calculating a degree of control based on various operating conditions if the engine can be started;

transmission data detection means for detecting whether transmission data is properly transmitted before determination of allowance to start the engine;

data return means for returning data which causes one of said engine control means and antitheft means to recognize that data is received by another of said antitheft means and engine control means as the result of data transmission;

data circuit establishment detection means for detecting whether or not the returned data is correct and for determining establishment of a data circuit between said engine control means and antitheft means if said returned data is correct;

data transmission repeat means for repeating data transmission which requests again the returned data if said returned data is not correct; and normal data communication means for starting communication of engine start allowance and inhibit data between said engine control means and antitheft means when said data circuit is detected to be established by said data circuit establishment detection means.

3. An anti-theft device for a vehicle according to claim 1 further comprising a transmitting side which determines normal transmission by verifying data transmitted by the transmitting side is received at a receiving side by means of an echo check method.

4. An anti-theft device for a vehicle according to claim 1, further comprising communication conflict detection means for defining a protocol where the data transmitting side in data transmitting through a communication line halts transmitting data and performs data receiving when the data transmitting side recognizes transmitted data from another end of the communication line.

5. An anti-theft device for a vehicle according to claim 2, wherein the engine control means performs a plurality of cycles of data exchange with the anti-theft means through the normal data communication means and authenticates data transmitted from said anti-theft means based on result of the data exchange.

6. An anti-theft device for a vehicle according to claim 4, wherein the communication conflict detection means determines a communication conflict when the data transmitting side detects a mismatch with data received by the data receiving side by checking the data transmitted by the data transmitting side.

7. An anti-theft vehicle security system comprising:

a first control means for determining whether starting of an engine should be allowed based on an external signal and for providing a determination result;

a second control means for performing start permission/ start prohibition control of said engine based on the determination result of the first control means; and communication means for managing exchange of control data between the first and second control means and for setting a protocol where, when one of said first and second control means is a data transmitting side and the other is a data receiving side which is receiving data, said data receiving side sends a result indicating recognition of the data transmitted from said data transmitting side back to said data transmitting side as reply data wherein the communication means comprises communication conflict detection means for defining a protocol where the data transmitting side halts transmitting data and performs data receiving when the data transmitting side recognizes transmitted data from another end of the communication line.

8. An anti-theft vehicle security system according to claim 7, wherein the communication conflict detection means determines a communication conflict when the data transmitting side detects a mismatch with data received by the data receiving side by checking the data transmitted by the data transmitting side.

* * * * *